Sept. 26, 1961   W. S. BOYLE ET AL   3,002,156
D.C. PUMPED SOLID STATE MASER
Filed Feb. 8, 1960
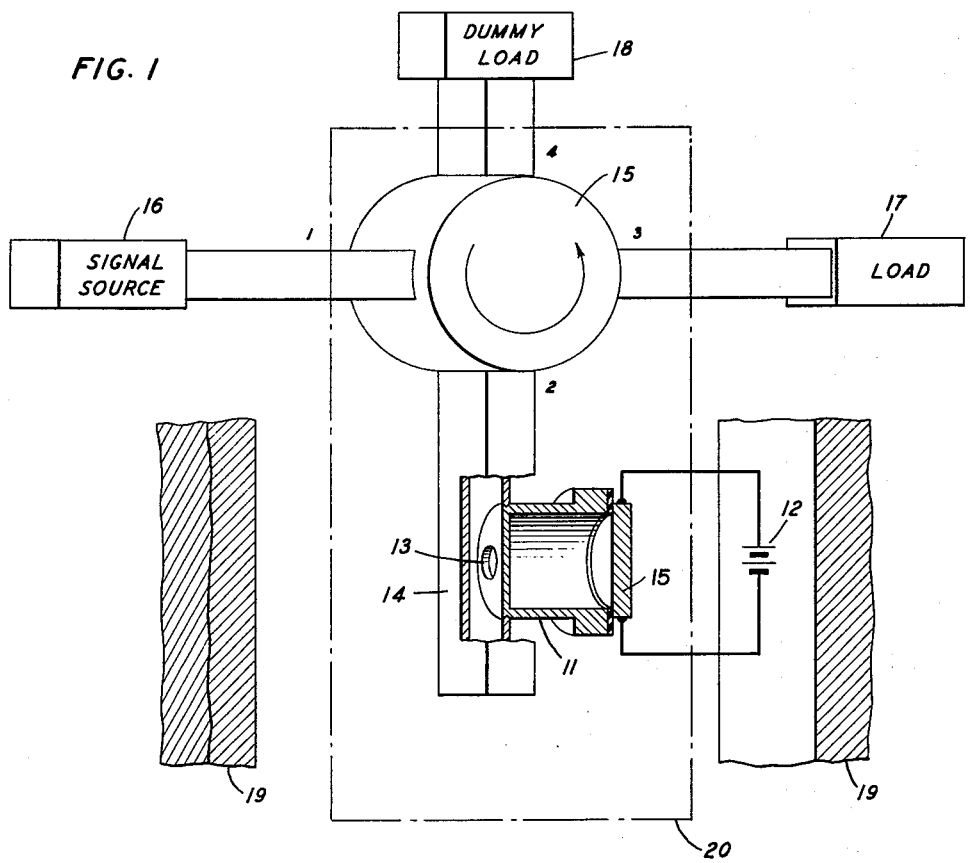
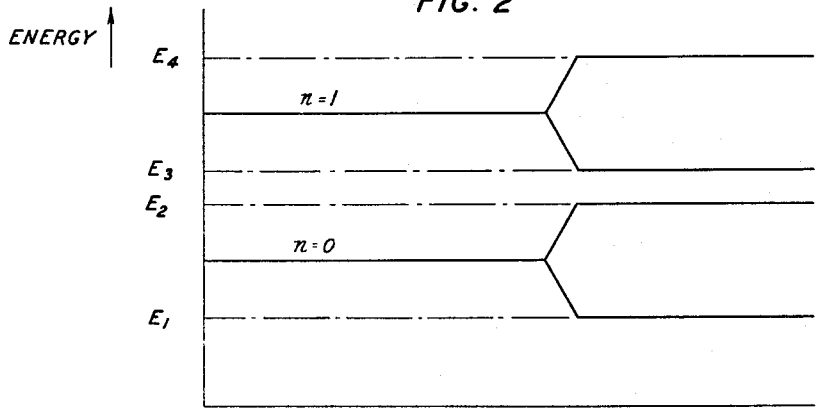
ENERGY DIAGRAM OF BISMUTH
IN AN APPLIED MAGNETIC FIELD
INVENTORS: W. S. BOYLE
G. E. SMITH
BY
ATTORNEY

UNITED STATES PATENT OFFICE 3,002,156
Patented Sept. 26, 1961

3,002,156
D.C. PUMPED SOLID STATE MASER
Willard S. Boyle, Berkeley Heights, and George E. Smith, Plainfield, N.J., assignors to Bell Telephone Laboratories, Incorporated, New York, N.Y., a corporation of New York
Filed Feb. 8, 1960, Ser. No. 7,144
3 Claims. (Cl. 330—4)

This invention relates to a solid state maser.

As is known to workers in the art, a maser is a device which depends for operation on the stimulation of radiative transitions between two energy levels which are inverted in population, i.e., which exhibit a negative temperature. In particular, it is characteristic of a medium which includes a pair of inverted energy levels that radiation of the frequency which satisfies the Bohr relation with respect to the two levels can be stimulated by the application of energy of the corresponding frequency.

Various arrangements have been devised for the creation of an inverted population state in a medium. Of special interest are arrangements which permit a negative temperature to be maintained continuously between a pair of levels. Such arrangements make possible amplification or generation of a continuous signal wave rather than discrete pulses. Arrangements of this kind in the past typically have involved the application of pumping energy of a frequency higher than the signal wave. This adds obvious complexities.

An object of the present invention is a maser capable of continuous wave operation which avoids the need for the application of pumping energy of a frequency higher than the signal frequency.

More particularly, an object of the present invention is a maser which can be maintained continuously over relatively long periods of time in a negative temperature state simply by the application of pumping power from a direct current source.

Another problem associated with the usual form of prior art masers capable of continuous wave operation is that they have employed as the active medium either para-magnetic material or a molecular beam. In either case it is difficult to achieve a high concentration of active radiative centers. This, in turn, has limited the amount of radiative energy available and consequently the power-handling capacity of the maser.

Accordingly, another object of the present invention is a maser of increased power-handling capacity.

A feature of the invention is an active medium consisting of a semimetal, for example, bismuth or antimony. In particular, our invention is based on the following contributions we have made to the art. First, it has been discovered that such a medium has, under appropriate conditions of applied steady magnetic field, a multilevel energy system convenient for use in a maser. Second, it has been recognized that the energy level system achieved is peculiarly well adapted for D.-C. pumping for establishing an inverted population between a discrete pair of energy levels.

In an illustrative embodiment in accordance with the invention, a single crystal sample of high purity bismuth is made one end of a microwave cavity and the cavity is immersed in a steady magnetic field of prescribed strength. The cavity is refrigerated to a suitably low temperature, as is characteristic of solid state masers. A D.-C. voltage of appropriate magnitude is maintained between opposite ends of the bismuth sample. A connection is provided to the cavity for the introduction of the input signal and the withdrawal of the amplified output signal.

The invention will be better understood from the following more detailed description, taken in conjunction with the accompanying drawing, in which:

FIG. 1 shows in schematic form an illustrative maser in accordance with the invention; and FIG. 2 is an energy level diagram of the semimetal bismuth when immersed in an appropriate magnetic field.

With reference now more particularly to the drawing, the maser shown in FIG. 1 includes a cylindrical cavity 11 which includes one end wall which is of bismuth, advantageously of high purity and single crystal form, having its inner surface plane crystallographically oriented, for example, perpendicular to the axis of two-fold symmetry. In particular, this end wall is formed of a square element 15 of bismuth appropriately positioned to close off the cavity completely. This element is electrically isolated for D.-C. currents from the remainder of the cavity so that an electric field may effectively be established in the element. For this purpose D.-C. voltage source 12 is connected between opposite ends of the bismuth element. The remaining cavity walls are of copper, advantageously gold plated, to minimize losses. The cavity is provided with a coupling aperture 13 by means of which wave energy can be applied to or abstracted from the cavity. The coupling aperture opens into a rectangular wave guide 14 which forms one arm of a circulator 15, other arms of which lead to an input signal source 16, a useful load 17, and a dummy load 18. The cavity is immersed in a steady magnetic field established between pole pieces 19 of a magnet. The magnetic field is oriented to be perpendicular to the plane of the bismuth sample. The cavity and, advantageously, the circulator are enclosed within suitable refrigerating means, shown schematically by broken line 20, so that they may be maintained at liquid helium temperatures.

In operation, the input signal from the source 16 is supplied selectively by the circulator 15 to the cavity 11 for amplification. The amplified output signal is supplied by the circulator 15 selectively to the useful load 17. Any reflected energy from the useful load 17 is supplied by the circulator 15 selectively to the dummy load 18 for dissipation.

It has been discovered that bismuth of the kind described when immersed in a magnetic field and in the absence of any applied steady electric field is characterized by an energy level diagram of the kind shown in FIG. 2. Levels $n=0$ and $n=1$ are the two lowest Landau or cyclotron resonance levels resulting from the orbital splitting. Each of these levels is split further by the spin of the conduction electrons to provide levels $E_1$, $E_2$, $E_3$ and $E_4$. The g-splitting factor for the spin resonance is high in semimetals, having in bismuth a value of over 100 along the axis of two-fold symmetry. In particular, it has been found that in bismuth the spin splitting is nearly equal to the orbital splitting as shown. Both the orbital and spin splitting can be controlled by the strength and orientation of the magnetic field.

The application of a steady electric field can be made to cause a transition selectively between levels $E_1$ and $E_3$. Such transitions can be achieved by two mechanisms. The first is a transition resulting from a collision with the lattice and the second from carrier tunneling into an upper level. The criteria important for both these mechanisms is the strength of the applied electric field, the separation of the Landau levels and the mean free path of the conduction electrons. This last factor can advantageously be made long by high purity single crystal material. The electric field can be made advantageously large by the application of a sufficiently high voltage.

The transition between levels $E_1$ and $E_3$ can be induced without inducing transitions between levels $E_1$ and $E_2$, at least to the first order, because levels $E_1$ and $E_2$ are levels with different spin and a D.-C. electric field cannot cause a spin flip by itself. Moreover, spin transitions due to collisions will be small.

In particular, the steady magnetic field is adjusted so that in the absence of any applied electric field only level $E_1$ is occupied to any substantial extent, and the carriers are all predominantly in the single lower spin state. Operation at an appropriately low temperature helps insure that only level $E_1$ is occupied. Thereafter, the application of a D.-C. electric field is used to cause transitions selectively from level $E_1$ to level $E_3$. This results in an inverted population between levels $E_2$ and $E_3$, and thereafter the stimulation of radiative transitions between these levels can be the basis for maser operation. Moreover, since the conduction electron population in bismuth is high, a large difference may be achieved in the population of levels $E_2$ and $E_3$, and the power handling capacity of a maser of this kind is high comparable to that of the usual prior art form.

For increased efficiency, the cavity 11 is designed to be resonant at the frequency corresponding to the separation of levels $E_2$ and $E_3$. The separation of levels $E_2$ and $E_3$ and, accordingly, the operating frequency can be adjusted by the strength and orientation of the steady magnetic field.

Under the conditions described, an input signal of the frequency which corresponds to the separation of levels $E_2$ and $E_3$ when supplied to the cavity will be amplified by the stimulation of radiative transitions between level $E_3$ and level $E_2$. Amplitude modulation can be achieved by modulation of the voltage supplied by the D.-C. voltage source.

An illustrative embodiment typical of the invention involves the application of a magnetic field of 15,000 gauss and the application of a D.-C. voltage sufficient to provide an electric field of approximately $10^{-3}$ volts/centimeter in the bismuth. Such an arrangement is useful for operation at a frequency of 300 kilomegacycles.

It is obvious that various modifications are possible in the basic embodiment described consistent with the principles set forth.

First, it is feasible to utilize other kinds of active material. There are various considerations affecting the choice of material. First, when immersed in a magnetic field of strength convenient for use, it should exhibit an energy level system of the kind shown in FIG. 2 where the levels $E_1$, $E_2$, $E_3$ and $E_4$ are sharp and appropriately spaced. In particular, this generally requires that the orbital splitting should be just slightly more than the spin splitting for operation in the microwave range. Larger differences are conductive to operation at shorter wavelengths, for example, as an optical maser. It is also important for high efficiency that the material include a high spin population.

Advantageously also, the conduction electrons should have a long mean free path in the active material. This typically is fostered by utilizing high purity monocrystalline material.

Other materials which advantageously satisfy the considerations described include the other semimetals, arsenic and antimony.

Other forms of cavities may be employed, such as rectangular. Moreover, the active medium can be enclosed within the cavity rather than forming a part thereof as described.

Other arrangements can be devised for supplying and abstracting the signal energy. In particular, separate input and output connections can be provided.

Additionally, the active medium may be disposed along a slow wave structure to provide a traveling wave maser in accordance with know principles as, for example, described in a paper entitled "The Three-Level Solid State Traveling Wave Maser," in the Bell System Technical Journal of March 1959, pages 305–334.

Moreover, the maser may be utilized for the generation of, rather than the amplification of, signal energy in accordance with known principles. For example, noise arising in the cavity walls may be used to stimulate initially the radiative transition and serve as a basis for the self generation of oscillations at the frequency of the radiative transitions.

Moreover, in some instances, it may be advantageous to pulse the D.-C. voltage applied to minimize heating of the active element.

Additionally, in some instances it may be preferable to apply to the active element an alternating, rather than unidirectional, electric field although in this case the frequency of the alternations may be considerably lower than the input signal frequency and in this respect be an improvement over prior art masers which employ pumping energy of a frequency considerably higher than the signal frequency.

What is claimed is:

1. In combination, an active element of a material taken from the class consisting of bismuth, arsenic and antimony, means for forming a steady magnetic field through said element for creating in said element an energy level system which includes at least four levels of which the first and second represent opposite spins of the lowest cyclotron resonance level and the third and fourth opposite spins of the succeeding cyclotron resonance level, the strength of the magnetic field applied and the temperature of the element being such that in the absence of an applied electric field only the first of said levels is significantly populated, means for providing a D.-C. electric field in the element of such strength as to induce transitions from said first to third levels for creating a population inversion between said second and third levels, and means for supplying for amplification to the element an input signal of the frequency corresponding to the separation of said second and third levels and for abstracting therefrom an amplified replica of the input signal.

2. The combination of claim 1 in which the active element forms a wall portion of a cavity resonant at the frequency corresponding to the separation of said second and third levels.

3. The combination of claim 1 in which the active element is high purity monocrystalline bismuth.

References Cited in the file of this patent

UNITED STATES PATENTS

| 2,743,322 | Pierce et al. | Apr. 24, 1956 |
| 2,909,654 | Bloembergen | Oct. 20, 1959 |

FOREIGN PATENTS

| 1,177,860 | France | Dec. 8, 1958 |
| 811,049 | Great Britain | Mar. 25, 1959 |